United States Patent Office 3,552,792
Patented Jan. 5, 1971

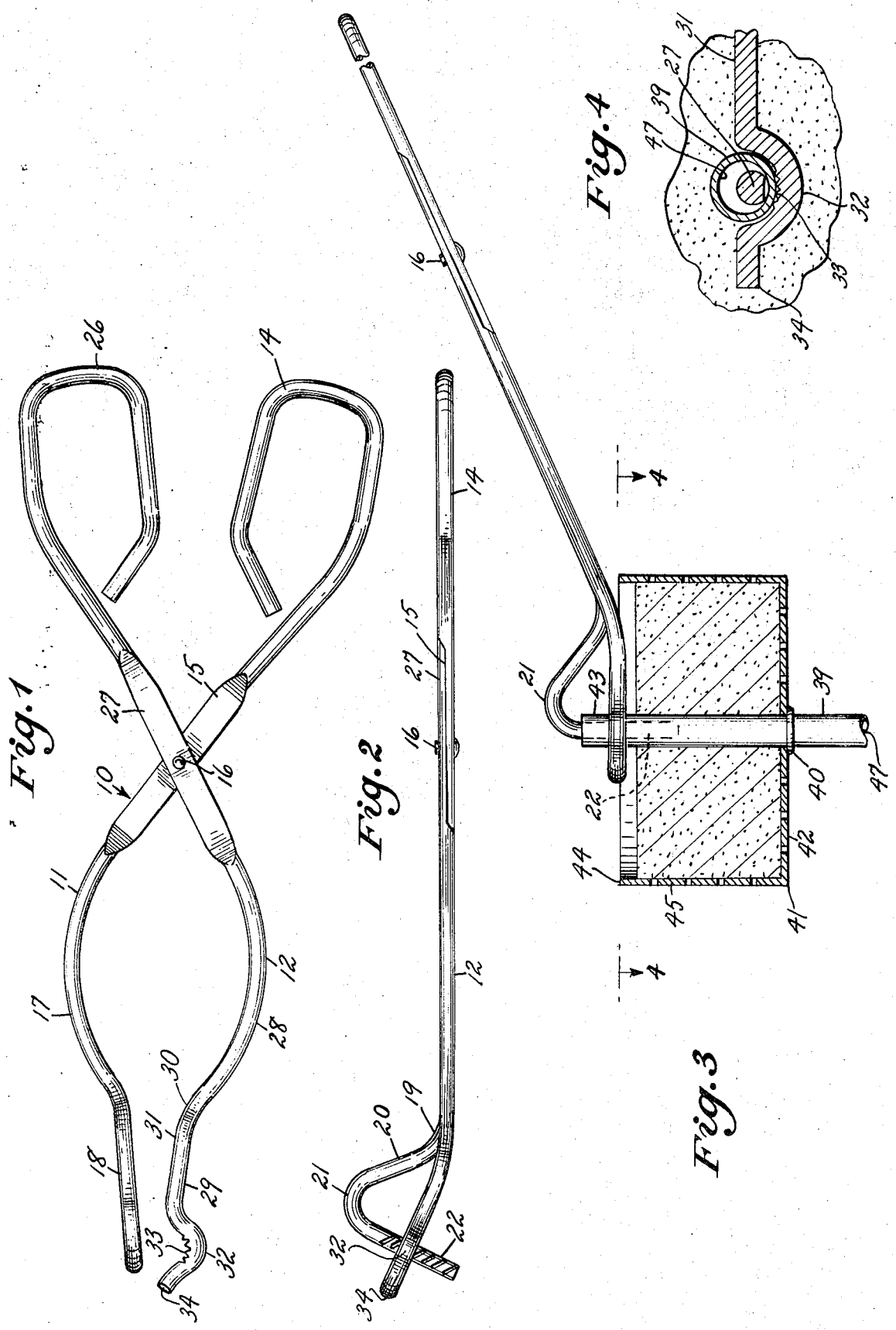

---

3,552,792
COFFEE BASKET HANDLING IMPLEMENT
Jules Granat and Adele Granat, both of
242—16 131 Road, Rosedale, N.Y. 11422
Filed Oct. 14, 1968, Ser. No. 767,134
Int. Cl. A47j *45/00*
U.S. Cl. 294—28                       2 Claims

ABSTRACT OF THE DISCLOSURE

A tonglike device for handling the coffee-retaining basket in a coffee percolator having means for engaging the hollow stem thereof on the inner and outer surfaces.

---

This invention relates generally to the field tonglike implements, and more particularly to a specific device for handling the coffee retaining basket normally used in conjunction with coffee percolators or similar devices.

At the conclusion of a coffee making operation, it is difficult to remove the basket from the mouth of the percolator after first removing the percolator top, owing to the fact that the grounds thereof are quite hot, and remaining heat is rapidly transferred to the basket which is generally made of aluminum, a highly heat-conducive device. Generally, the only portion of the same which can be manually grasped is the upper end of the hollow stem through which liquid passes to impinge upon the percolator top, as the rim of the basket is normally aligned with the rim of the pot, or slightly there below. This extension is normally difficult to grasp even when cool, and in heated condition, it is impossible to physically hold the same for a sufficient long period to transfer the same to a point of disposal of the used coffee grounds.

It is therefore among the principal objects of the present invention to provide an improved device for picking up the coffee basket and associated stem without the necessity of physically touching the same.

Another object of the invention lies in the provision of the device of the class described in which the cost of manufacturing may be a reasonably low order, with consequent wide sale, distribution and use.

A further object of the invention lies in the provision of an improved device of the class described which may be conveniently manipulated between the thumb and forefinger by a user.

A further object of the invention lies in the provision of an improved device of the class described which comprises only two relatively moving parts.

A feature of the disclosed embodiment lies in the fact that the same may be manufactured almost entirely from elongated steel wire suitably bent to proper configuration.

These objects, as well as other incidental ends and advantages, will more fully appear in the progress of the following disclosure, and be pointed out in the appended claims.

In the drawing, to which reference will be made in the specification, similar reference characters have been employed to designate corresponding parts throughout the several views.

FIG. 1 is a plan view of an embodiment of the invention.

FIG. 2 is a side elevational view thereof.

FIG. 3 is a side elevational view thereof, partly in section, showing the device in engaged condition with respect to a coffee retaining basket.

FIG. 4 is a fragmentary sectional view as seen from the plane 4—4 in FIG. 3.

In accordance with the invention, the device, generally indicated by reference character 10, comprises broadly: first and second tong elements 11 and 12, respectively.

The first tong element 11, as has been mentioned, may be formed from elongated steel wire, and includes manually-engageable loop means 14, a flattened member 15 pivotally interconnected to the second tong element 12 by rivet means 16. The flattened member 15 connects with a curved member 17 leading to a basket engaging member 18. The basket engaging member 18 includes a bend portion 19, and upwardly inclined portion 20, a downwardly curved portion 21 and an elongated serrated portion 22, the terminal part of which is insertable within the stem of a coffee basket.

The second tong element 12 is generally similar, including manually engageable loop means 26, a flattened cross member 27, a curved member 28, and a basket-engaging member 29, the member 29 including a bend portion 30, an elongated portion 31, a curved portion 32 having an inner-serrated surface 33 and a terminal portion 34.

Referring to FIGS. 3 and 4, there is illustrated a conventional coffee basket element used with a percolator (not shown). Structures known in the art include a hollow stem 39 through which boiling water moves upwardly to impinge upon the percolator top, and subsequently fall upon the coffee grounds. The stem 39 includes an enlargement 40 supporting a perforated basket 41 at the lower surface 42 thereof. The upper end 43 of the stem 39 projects above the upper edge 44 of the cylindrical sidewall 45 of the basket 41, thus permitting the same to be engaged to be withdrawn from the percolator after use.

To engage the coffee basket for removal, it is necessary only to spread the tong elements 11 and 12 to permit the first element 11 to be engaged within the hollow bore 47 of the stem 39, and subsequently close the tong elements whereby the second tong element 18 engages the outer surface 48 of the stem 39 to grip the stem therebetween. In this condition, the stem may be lifted directly from the percolator and transferred to the required location.

We wish it to be understood that we do not consider the invention limited to the precise details and structures shown and set forth in this specification, for obvious modifications will occur to those skilled in the art to which the invention pertains.

We claim:
1. A tonglike device for handling a coffee-retaining basket used in conjunction with a coffee percolator, or similar article comprising: first and second elongated tong elements interconnected at median points on for relative angular movement therebetween, each of said tong elements having manually engageable means at one end thereof; said first tong element lying substantially in a first plane and terminating in an elongated member of generally cylindrical configuration, the principal axis of which is disposed at a substantial angle with respect to said plane; said second tong element terminating in a curved member lying in a plane substantially perpendicular to said principal axis of said elongated member on said first tong element; whereby pivotal movement to a predetermined relative position between said first and second tong ele- ments permits the engagement of a hollow tubular stem of a coffee retaining basket, with the engagement of said elongated member on said first tong element within the bore of said hollow stem, and said curved member of said second tong element engaging in oppositely disposed surface of said stem, whereby said stem is clamped therebetween.

2. Structure in accordance with claim 1, said elongated member and curved member having opposed serrated surfaces.

References Cited

UNITED STATES PATENTS

| 2,506,227 | 5/1950 | Lindsey | 294—118 |
| 3,352,589 | 11/1967 | Kilroy et al. | 294—28 |

ANDRES H. NIELSEN, Primary Examiner

U.S. Cl. X.R.

294—118